June 23, 1925.
A. ARMSTRONG
TRAP
Filed July 23, 1923
1,543,312
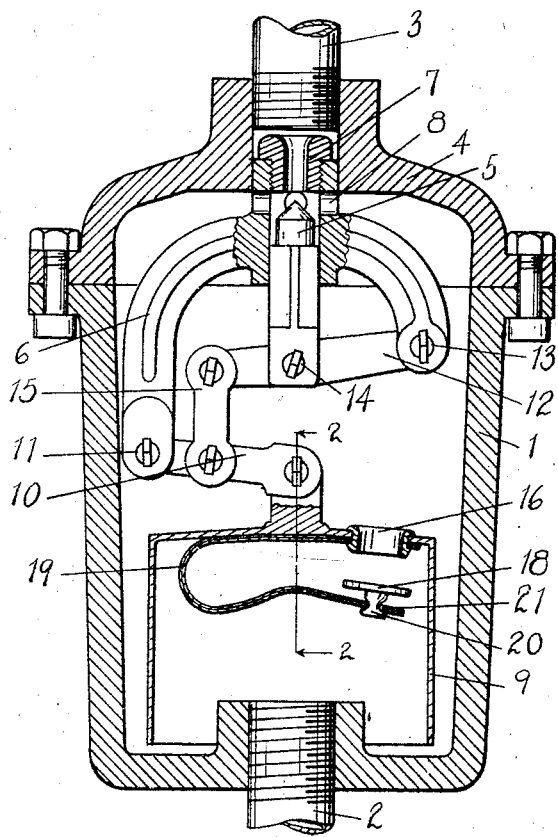
Fig. I.
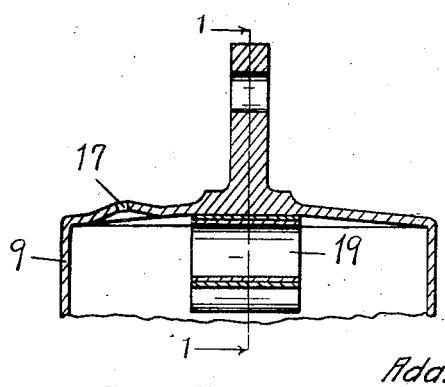
Fig. II.
INVENTOR.
Adam Armstrong
BY
Chappell Earl
ATTORNEYS Patented June 23, 1925.

1,543,312

UNITED STATES PATENT OFFICE.

ADAM ARMSTRONG, OF THREE RIVERS, MICHIGAN.

TRAP.

Application filed July 23, 1923. Serial No. 653,226.

*To all whom it may concern:*

Be it known that I, ADAM ARMSTRONG, a citizen of the United States, residing at Three Rivers, county of St. Joseph, State of Michigan, have invented certain new and useful Improvements in Traps, of which the following is a specification.

This invention relates to improvements in traps.

The main objects of the invention are:

First, to provide an improved steam trap which is of large capacity although of small dimensions.

Second, to provide an improved trap which discharges freely until predetermined temperatures are reached, thereby rendering the trap particularly desirable for use in places where the parts controlled are not subject to continuous operations or continuously maintained at uniform temperatures.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a vertical section through my improved trap on a line corresponding to line 1—1 of Fig. II, parts being shown in full lines for convenience in illustration, the inlet and discharge pipes being omitted.

Fig. II is a detail vertical section on a line corresponding to line 2—2 of Fig. I.

In the drawing similar reference characters refer to similar parts throughout both views.

Referring to the drawing, the trap casing 1 is provided with an inlet 2 at the bottom and discharge 3 at the top. The top 4, in the structure illustrated, is removable for assembling and to afford access to the discharge valve. The discharge 3 is controlled by the valve 5 which is supported in the yoke-like bracket 6 secured to the top and having the valve seat 7 threaded into the upper end thereof. The valve 5 is supported for vertical sliding movement in this support 6, the support having lateral openings 8 below the valve seat. The float 9 is mounted on the lever 10 pivoted at 11 on one arm of the bracket, the lever 12 being pivoted at 13 on the other arm of the bracket and connected by the pivot 14 to the valve. The link 15 connects these levers so that the movement of the float 9 is imparted to the discharge valve. The float 9 is in the form of an inverted cup or receptacle; that is, it is open at the bottom and disposed so that the inlet delivers to the lower end thereof. The float is provided with a discharge port 16 and a relatively small vent 17. The discharge port 16 is controlled by the valve 18 which is supported by the U-shaped member 19 of thermostatic metal, one arm of this member being secured by the port member 16 which is in the form of an eyelet-like thimble, the valve being mounted on the free end. The valve 18 has a stem 20 which is arranged through a hole 21 in the arm of the member 19 and headed so that it is somewhat loosely supported therein, thereby insuring its seating when the valve is closed by the action of the thermostatic member.

This thermostatic member is formed of two kinds of metal, as is well-known practice.

When the temperature is below a predetermined point the valve is open so that air and cold water are freely discharged through the port 16. However, when the temperature is raised to a predetermined point, the valve is closed so that the float functions in a normal manner, the vent 17 preventing the float becoming air-bound.

In certain machinery, for instance, the cylinders of paper driers, there is a large amount of air and sometimes water to be expelled in starting the machine or when it has been allowed to cool off, as is sometimes necessary for repairs and for other causes; and similar conditions arise in heating systems.

By my improved trap the systems may be quickly brought to normal operating conditions.

I have not attempted to illustrate or describe other modifications or adaptations which I contemplate as I believe the disclosure made will enable those skilled in the art to which my invention relates to embody or adapt the same as may be desired.

Having thus described my invention, what I claim as new and desire to secure by Letters Patent, is:

1. In a trap, the combination of a casing provided with an inlet at the bottom and a discharge valve at the top, a float open at its lower end disposed above said inlet and having operative connections to said discharge valve, said float having a port in the top thereof and a relatively small vent, a valve for said float port, and a U-shaped support therefor of thermostatic metal mounted within said float and adapted when heated to close said valve for said float port.

2. In a trap, the combination of a casing provided with an inlet at the bottom and a discharge valve at the top, a float open at its lower end disposed above said inlet and having operative connections to said discharge valve, said float having a port in the top thereof, a valve for said float port, and a U-shaped support therefor of thermostatic metal mounted within said float and adapted when heated to close said valve for said float port.

3. In a trap, the combination of a casing provided with a discharge valve, a float operatively connected to said discharge valve, said float being open at the lower end and having a port at the top thereof and also a vent, said casing having an inlet delivering below said float, a valve for said float port, and a support therefor of thermostatic metal arranged within the float and so that when heated said port is closed.

4. In a trap, the combination of a casing provided with a discharge valve, a float operatively connected to said discharge valve, said float being open at the lower end and having a port at the top thereof said casing having an inlet delivering below said float, a valve for said float port, and a support therefor of thermostatic metal arranged within the float and so that when heated said port is closed.

In witness whereof, I have hereunto set my hand and seal.

ADAM ARMSTRONG. [L. S.]